Jan. 1, 1946. B. G. CARLSON 2,392,120
FLUID CLUTCH AND POWER TRANSMISSION
Filed Oct. 7, 1944
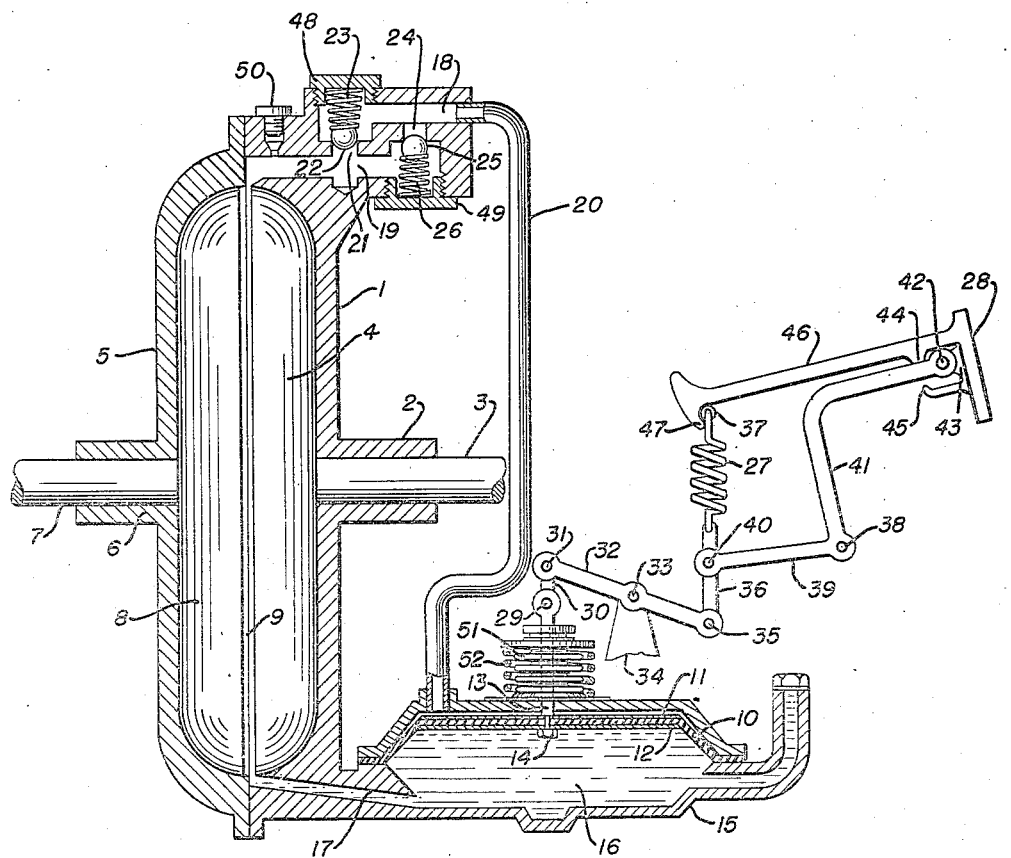
INVENTOR.
BERT G. CARLSON
BY
*Frank N. Harmon*
ATTORNEY Patented Jan. 1, 1946

2,392,120

UNITED STATES PATENT OFFICE 2,392,120

FLUID CLUTCH AND POWER TRANSMISSION

Bert G. Carlson, Gates Mills, Ohio, assignor to Jack & Heintz, Inc., Bedford, Ohio, a corporation of Ohio Application October 7, 1944, Serial No. 557,573

4 Claims. (Cl. 60—54)

This invention relates to hydraulic clutch and transmission devices and has for one of its primary objects to provide an improved hydraulic clutch which is simple in construction and chatterproof, leakproof and foolproof in operation.

Another object is to provide such a self-contained hydraulic clutch unit in which the cubic content of the liquid and air will remain constant and in which applied pressure will fill the clutch elements with liquid to render it effective for transmitting torque and in which, upon a release of such applied pressure, the clutch elements will be automatically evacuated of liquid by gravity and air pressure.

To this end, and as the invention lends itself particularly, but not exclusively, to a clutch unit for motor vehicles, it is proposed to provide a self-contained clutch unit to include a fluid reservoir in communication with the space between the two elements of a fluid coupling, one of which is rigid with the engine shaft and the other with a driven shaft. The liquid compartment may be provided with a diaphragm arranged above the liquid level. The diaphragm is operable to force the liquid between the coupling elements as air is exhausted from the coupling into a by-pass leading to the upper side of the diaphragm. Release of pressure on the diaphragm causes the liquid to flow from the coupling back into the reservoir under air pressure and gravity.

With the foregoing and other objects in view the invention resides in the combination of parts and in the details of construction set forth in the following description and appended claims, certain embodiments thereof being illustrated in the accompanying drawing which is a schematic view of the clutch unit and operating mechanism, showing the same with its clutch members, liquid reservoir and operating diaphragm in vertical section.

Referring more particularly to the drawing, the self-contained clutch unit comprises a casing 1 with a suitable bearing 2 for a transmission driven shaft 3 which carries one element 4 of a conventional liquid coupling. A complementary concave wall 5 is suitably secured to casing 1 to be air-tight and have a suitable bearing 6 to support an engine drive shaft 7 carried by the other opposed element 8 of the fluid coupling, there being a space 9 between elements 4 and 8 which when filled with liquid causes transmission of the torque from shaft 3 to shaft 7 but which when empty leaves shaft 3 to rotate freely while shaft 7 remains idle.

The drawing shows a liquid reservoir 15 provided with a flexible diaphragm 10 secured between its upper and lower separable parts. On the upper and lower sides of the diaphragm are two central stiffening washers 11 and 12 to which is secured by a nut 14 an operating lever 13 slidable in the upper wall of the reservoir. The drawing shows the reservoir to be practically filled with liquid 16 on the under side of the diaphragm which is shown forced upwardly against the inner side of the upper wall of the reservoir. This means a complete evacuation of liquid from between the fluid coupling members 4 and 8 through passage 17 by gravity and the pressure of the air column above it.

The upper part of the casing has a pair of air passages 18 and 19. To passage 18 is connected a tube 20 leading to the upper side of diaphragm 10 in the reservoir. Passage 19 leads directly to the space 9 between the fluid coupling 4—8 and through port 21 to passage 18, which port is normally closed by a ball check valve 22 under the action of a compression coil spring 23 in a plug 48 but opened upon upward air pressure to permit exhaust of air from space 9 into passage 18 and through tube 20 to the upper side of the diaphragm. Another port 24 is provided which is normally closed by a ball check valve 25 under the action of a compression coil spring 26 in a plug 49 but opened by upward pressure of air in tube 20 to permit escape thereof through port 24 and through passage 19 into space 9. As an added refinement a plug 50 may be provided so as to be removed for the purpose of checking the liquid level and for filling.

The mechanical means for controlling the operation of the diaphragm may include a linkage under the control of a tension coil spring 27 and a foot pedal 28. To arm 13 is pivotally connected at 29 a link 30 which is pivotally connected at 31 to a rocking arm 32 pivotally connected at 33 to a stationary frame bracket 34. The other end of arm 32 is pivotally connected at 35 to an arm 36 whose other end has connected thereto the tension coil spring 27 with its other end anchored at 37 to the stationary frame. A bell crank mounted on a stationary pivot 38 has one of its arms 39 pivotally connected at 40 to arm 36 and its other arm 41 pivotally connected at 42 to a bracket 43 of the foot pedal 28. The foot pedal 28 has two limiting stops 44 and 45 to engage either side of arm 41 to limit the pivotal movement of the pedal about its pivotal connection 42 to arm 41. The foot pedal has an integral arm 46 with a retaining lug 47 for engaging the stationary frame catch 37 to which latter the spring 27 is attached.

In the position shown in the drawing, the foot pedal and its arm 46 has been tilted counterclockwise about its pivot 42 with stop 44 against arm 41 and lug 47 engaging behind the catch 37. This is against the action of tension spring 27 and maintains the diaphragm 10 in the upper position shown to permit the flow of liquid from the space 9 through passage 17 to fill the reservoir under gravity and air pressure, as previously described.

Tilting of the foot pedal clockwise about pivot 42 removes lug 47 from behind catch 37 and a release of pressure on the foot pedal permits spring 27 to pull upwardly on arm 36. This rocks lever 32 counterclockwise, forcing arm 13 and diaphragm 10 downwardly to force liquid from the reservoir into space 9 to make the fluid coupling 4—8 into an operative torque transmitting fluid clutch.

In order to insure a leakproof fit for arm 13 in its reciprocatory movement in operating the diaphragm there may be provided a sealed bellows 51 normally spring actuated downwardly by a tension coil spring 52.

I claim:

1. In a hydraulic power transmission device, a driving shaft and a driven shaft, a fluid coupling having one of its complementary elements carried by one shaft and the other spaced element by the other shaft, means under manual control for supplying liquid to said coupling to render it effective as a torque transmitting device and for evacuating liquid therefrom to render it ineffective as such, said means comprising a casing surrounding said fluid coupling, a liquid reservoir in said casing located below said coupling and a communicating passage therebetween, a flexible diaphragm located in said reservoir above said liquid and an air by-pass from said coupling to the upper side of said diaphragm, the chamber above said diaphragm, formed by the insertion of said diaphragm in said casing, being closed except for said air by-pass.

2. In a hydraulic power transmission device, a driving shaft and a driven shaft, a fluid coupling having one of its complementary elements carried by one shaft and the other spaced element by the other shaft, a casing surrounding said fluid coupling, a liquid reservoir in said casing located below said coupling and a communicating passage therebetween, a flexible diaphragm located in said reservoir above said liquid and an air by-pass from said coupling to the upper side of said diaphragm, the chamber above said diaphragm, formed by the insertion of said diaphragm in said casing, being closed except for said air by-pass.

3. In a hydraulic power transmission device, a driving shaft and a driven shaft, a fluid coupling having one of its complementary elements carried by one shaft and the other spaced element by the other shaft, a casing surrounding said fluid coupling, a liquid reservoir in said casing located below said coupling and a communicating passage therebetween, a flexible diaphragm located in said reservoir above said liquid and an air by-pass from said coupling to the upper side of said diaphragm, the chamber above said diaphragm, formed by the insertion of said diaphragm in said casing, being closed except for said air by-pass, manual means for lifting said diaphragm to permit liquid to flow by gravity from said coupling to said reservoir and for creating air pressure in said by-pass and coupling to assist in forcing said liquid flow.

4. In a hydraulic power transmission device, a driving shaft and a driven shaft, a fluid coupling having one of its complementary elements carried by one shaft and the other spaced element by the other shaft, a casing surrounding said fluid coupling, a liquid reservoir in said casing located below said coupling and a communicating passage therebetween, a flexible diaphragm located in said reservoir above said liquid and an air by-pass from said coupling to the upper side of said diaphragm, the chamber above said diaphragm, formed by the insertion of said diaphragm in said casing, being closed except for said air by-pass, manual means for lifting said diaphragm to permit liquid to flow by gravity from said coupling to said reservoir and for creating air pressure in said by-pass and coupling to assist in forcing said liquid flow, and releasable locking means operable by said manual means for holding the latter and for retaining said diaphragm in said upper position.

BERT G. CARLSON.